United States Patent [19]

Vogt

[11] Patent Number: 4,558,487
[45] Date of Patent: Dec. 17, 1985

[54] APPARATUS FOR PROCESSING SIMILAR WORKPIECES OF VARYING SHAPE, POINTS OF CONTOUR AND DIMENSION

[75] Inventor: Norman H. Vogt, Lewiston, Mich.

[73] Assignee: William T. Sevald, Bellaire, Mich.

[21] Appl. No.: 633,785

[22] Filed: Jul. 23, 1984

Related U.S. Application Data

[63] Continuation-in-part of Ser. No. 373,441, Apr. 30, 1982.

[51] Int. Cl.$^4$ ............................................... A22B 5/00
[52] U.S. Cl. ..................................... 17/1 R; 414/660; 17/24
[58] Field of Search ..................... 83/404; 17/1 R, 24; 414/659, 660

[56] References Cited

U.S. PATENT DOCUMENTS

| | | | |
|---|---|---|---|
| 3,234,591 | 2/1966 | Vogt et al. | 17/1 R X |
| 3,439,815 | 4/1969 | Wagner et al. | 414/660 X |
| 3,447,704 | 6/1969 | Guilbert, Jr. | 414/659 |
| 3,908,813 | 9/1975 | Bertonelli | 83/404 X |
| 4,407,262 | 10/1983 | Wirz et al. | 83/404 X |

Primary Examiner—Willie G. Abercrombie
Attorney, Agent, or Firm—William T. Sevald

[57] ABSTRACT

Workpieces of varying dimension, points of common contour and shape are loaded on a transfer shuttle at loading station I and located on a projected line of light at a common point on the workpieces from which they vary; the shuttle moves the workpieces to first work station II; the shuttle is retracted and reloaded with workpieces; the shuttle then picks up the workpieces in station II; the shuttle then deposits the reloaded workpieces in station II, and the workpieces from station II in station III; the shuttle is retracted and station III emptied; the shuttle is reloaded and the repetition continues until the desired number of workpieces are processed. During reloading and any necessary time dwell, work is performed at work stations II and III and work may be performed during advancing movement of the shuttle.

4 Claims, 12 Drawing Figures

APPARATUS FOR PROCESSING SIMILAR WORKPIECES OF VARYING SHAPE, POINTS OF CONTOUR AND DIMENSION

This application is a continuation in part of application Ser. No. 06-373,441 of the same title, filed Apr. 30, 1982, by the same inventor and by the same attorney.

BACKGROUND OF THE PRESENT INVENTION

The automated production lines of the prior art handle workpieces which are the same shape, contour and dimension. Edges, holes, lugs, keys, depressions, detents, etc. are on the workpieces to provide interlocking positioning and/or gripping means so that identical workpieces may be identically located at work stations. The lines of the prior art reject workpieces which are not the same shape and dimension, and which vary in position and grip means. In other words, the prior art does not tolerate varying shape, contour and dimension, whereas the present invention provides facility for handling workpieces of varying shape, contour and dimension.

SUMMARY OF THE PRESENT INVENTION (The Frame and Shuttle)

An elongated frame has opposite sides and multiple stations such as the three shown and as many more stations as desired. Spaced and paired stubs are welded on the top of the sides of the frame. Drop-loop straps lie between the paired stubs forming workpiece receiving stirrups at each station after the first or loading station. A platen lies within the opposite sides of the frame below the stubs at all stations. Means are provided to raise and lower the platen relative to the stirrups. A shuttle is slidably located on the platen. The shuttle as shown extends between two stations of the frame. The shuttle may extend as many stations as desired. Upstanding paired legs are welded on the shuttle of such length to locate their upper ends above the stubs on the frame when raised by the platen. The legs lie inwardly of the stubs to bypass the stubs. Drop-loop straps lie between the tops of paired legs forming slings. The platen raises and lowers the shuttle. Means are provided to move the shuttle bi-directionally lengthwise on the platen relative to the stations of the frame in the raised and lowered positions of the platen.

A lamp at loading station I projects a line of light downwardly at a selected key point to indicate the proper loading of the workpiece. The loader aligns each workpiece on the slings at station I so that the common reference key point of the workpiece lies on the projected line of light and then activates the shuttle to move the workpieces to station II. While slings and stirrups are shown and described for holding workpieces, a trough may extend between the legs of the shuttle and troughs may be used on the stubs of the frame.

Workpieces are loaded in the slings of the shuttle at loading station I. Upward movement of the shuttle by the platen raises the bottom of the slings above the tops of the stubs and stirrups. Outward lengthwise movement of the shuttle moves the shuttle slings and the workpieces over the stirrups of the frame to which they are indexed. Downward movement of the shuttle moves the workpieces into contact with the stirrups at station II which is the first work station which now supports the workpieces. Further downward movement of the shuttle clears the legs and slings of the stubs, stirrups and workpieces. The shuttle is then retracted to its initial position where it is reloaded with workpieces. During the retraction and reloading, work is performed on the workpieces at station II. There are now workpieces at stations I and II but none at station III.

The shuttle is now raised and lifts the partially worked workpieces at work station II above the stirrups and stubs and lifts the reloaded workpieces at loading station I. The shuttle is moved lengthwise to the positions of work stations II and III. The shuttle is then lowered depositing the worked-on workpieces from station II in the stirrups of station III and the reloaded workpieces from station I in the stirrups of station II. During passage between stations II and III the workpieces from station II may have work performed on them. The shuttle is now lowered by the platen and returned to the reloading station and reloaded. During the return and reload, work on the workpieces is performed at work stations II and III and the processed workpieces at station III removed from the stirrups at station III but retained at station II. The operation described is continuous dependent only upon the workpieces being loaded and located at loading station I. Chutes and other transfer means receive the off-fall from the workpieces and convey them from the apparatus.

The frame may be any length and have any number of stations with the shuttle being extended to include sufficient stations to serve all the stations of the frame. Several frames and shuttles may be used, and transfers used between them. More than one shuttle may be used in one frame.

The method and apparatus, their function and operation, and the novel operation of the invention will be more clearly understood from the later detailed description taken in conjunction with the attached drawings now described.

DESCRIPTION OF THE DRAWINGS

FIG. 4 shows the platen and shuttle raised with workpieces A—A in the shuttle slings at loading station I.

FIG. 5 shows the raised shuttle moved to work stations II and III.

FIG. 6 shows the shuttle lowered in work stations II and III with the workpieces A—A deposited on the frame stirrups of station II.

FIG. 7 shows the shuttle brought back to stations I and II in the lowered position and workpieces A'—A' loaded at station I in the shuttle slings.

FIG. 8 shows the shuttle raised by the platen elevating the workpieces A'—A' at station I in the shuttle slings and lifting the workpieces A—A off the frame stirrups in station II.

FIG. 9 shows the shuttle moved to work stations II and III in the raised position with the workpieces A'—A' and A—A in the raised position in the shuttle slings.

FIG. 10 shows the shuttle lowered in stations II and III with the reloaded workpieces A'—A' deposited in the frame stirrups in work station II and the workpieces A—A deposited at work station III in the frame stirrups.

FIG. 11 shows the shuttle retracted to loading station I and workpieces A"—A" loaded in the shuttle slings; workpieces A'—A' on the frame stirrups at station II and workpieces A—A unloaded from station III.

DETAILED DESCRIPTION OF THE ILLUSTRATED EMBODIMENTS

Figure 1:
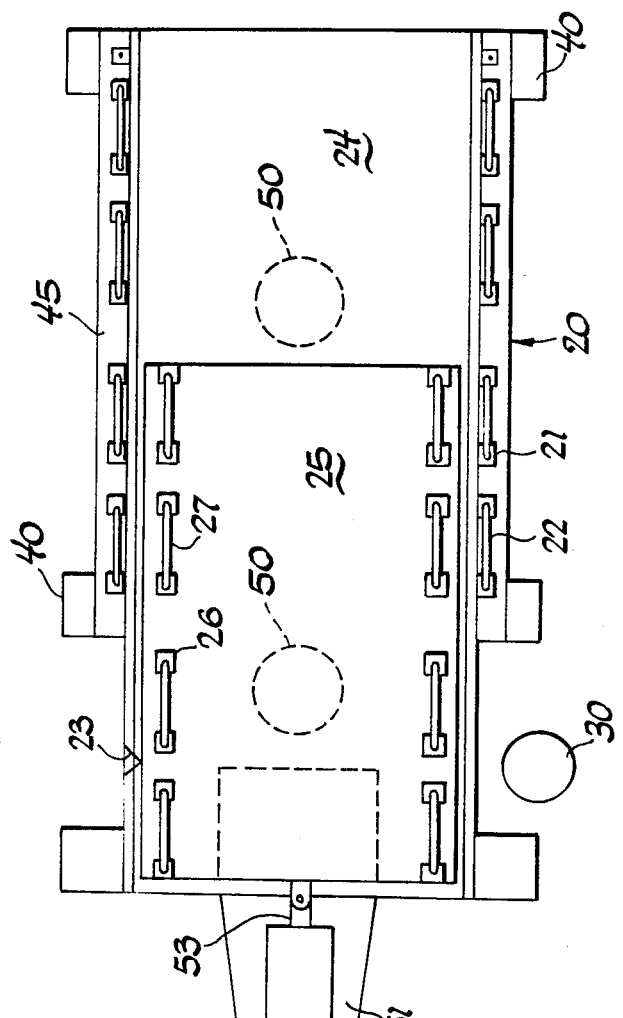
FIG. 1 is a plan diagrammatic view of stations I, II and III showing the frame, the stubs on the frame, the stirrups between paired stubs at stations II and III; and showing the shuttle in stations I and II, legs on the shuttle inboard of the stubs, slings, between the paired legs, and the platen portion in station III outward of the shuttle.
Figure 2:
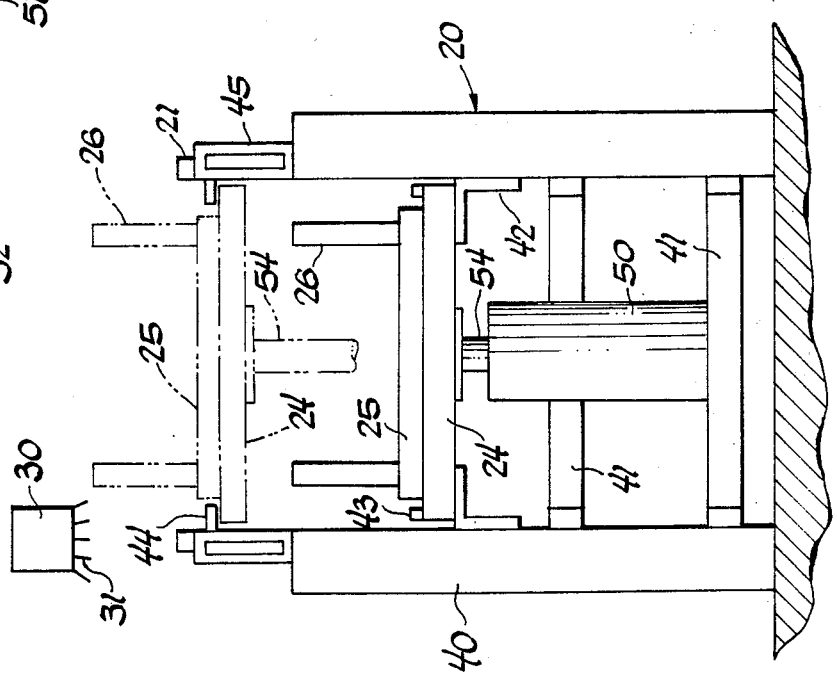
FIG. 2 is an end elevational diagrammatic view of the apparatus as seen in FIG. 1.
Figure 3:
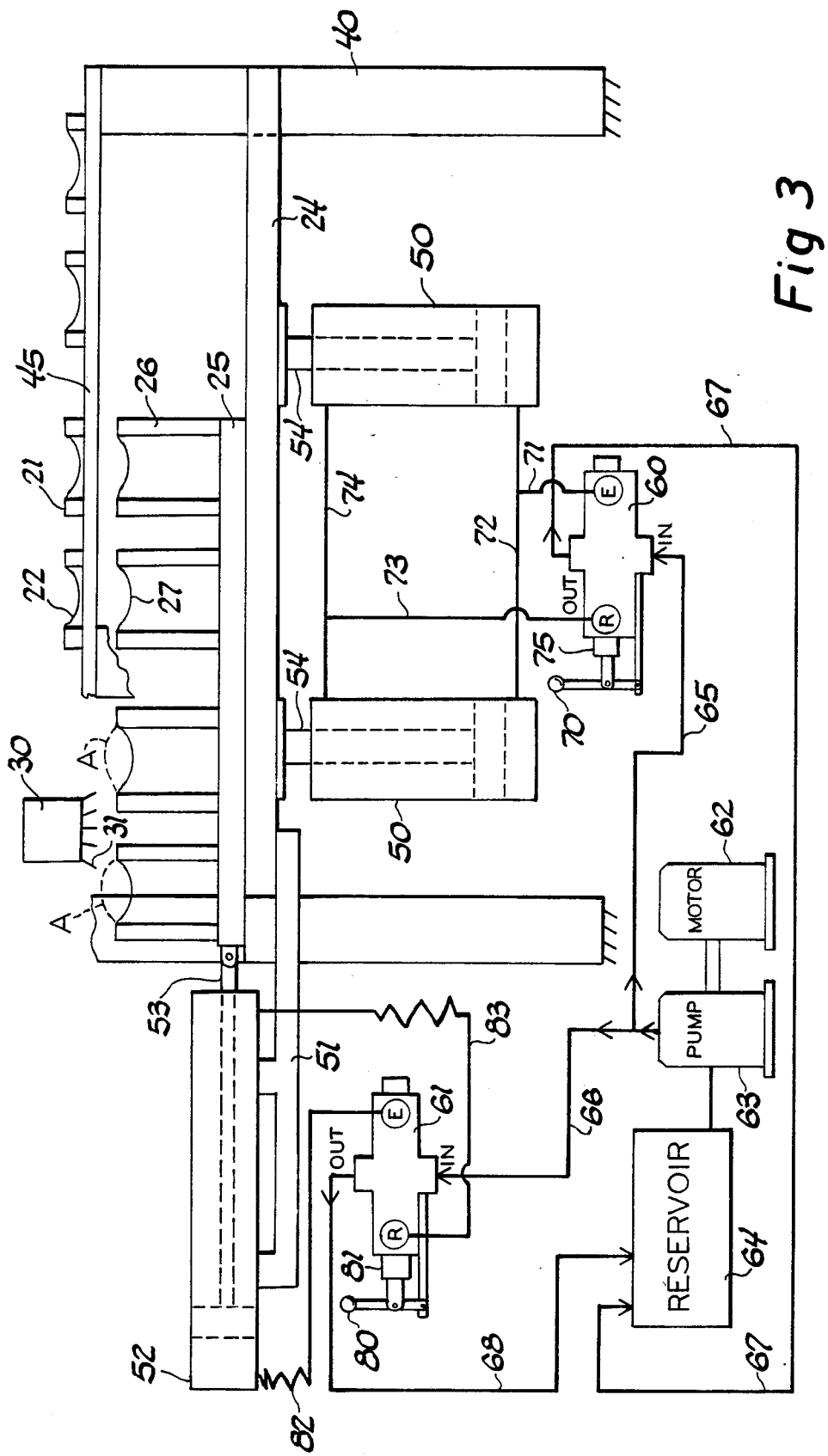
FIG. 3 is a side elevational diagrammatic view of the apparatus of FIGS. 1 and 2 showing the frame, stubs and stirrups; the platen; the shuttle, legs and slings; showing the hydraulic means, valves, and circuits for operating the platen and the shuttle, with the platen lowered and the shuttle retracted.

Referring now to the drawings where like reference numerals refer to like and corresponding parts throughout the several views, the method and apparatus of the invention for processing workpieces of varying contour, shape and dimension in sequential operations comprise a frame 20 extending lengthwise a distance to include a desired plurality of work stations such as stations I, II and III or more, FIGS. 1, 2 and 3. Upstanding stubs 21 are welded on the frame 20 and are paired with one another. Stirrups 22 hang between paired stubs 21 for receiving and supporting workpieces or objects A—A, A'—A' and A"—A". A key point is established for the system such as a line 23 on the frame 20.

A platen 24 lies in the frame 20. A shuttle 25 rests on the platen 24. Paired legs 26 extend upwardly on the shuttle 25. Slings 27 hang down between paired legs 26 for receiving and supporting workpieces at loading station I and transferring the workpieces to and between work stations II and III. A lamp 30 at station I projects a line of light 31 at the key point 23 and on the workpieces in loading station I. The attendant aligns the common reference point of the workpieces under the line of light 31 which properly locates the workpieces relative to the key point 23.

The frame 20 has posts 40 joined by cross-members 41. Flanges 42 support the platen 24 in its lowered position. The platen 24 has rails 43 guiding the linear travel of the shuttle 25. Stops 44 on the post extensions 45 limit the upward travel of the shuttle 25. Hydraulic cylinders 50 are supported on the cross-members 41 and raise and lower the platen 24 and shuttle 25 between the flanges 42 and the stops 44. An arm 51 extends from the platen 24. A hydraulic cylinder 52 is supported on the arm 51 to move up and down with the platen 24. A piston rod 53 extending from the cylinder 52 is attached to the shuttle 25 to move the shuttle 25 bi-directionally on the platen 24. The piston rods 54 of the cylinders 50 are connected to the platen 24.

A valve 60, FIGS. 3 to 11, controls the cylinders 50 and a valve 61 controls the cylinder 52. A motor 62 drives a pump 63 which is supplied by an oil reservoir 64. In the neutral position of the valves 60 and 61, FIG. 3, the pump 63 supplies oil pressure to the "in" side of the valves 60, 61 via lines 65 and 66 respectively and the valve spools 75 and 81 channel the oil back to the reservoir 64 via the "out" side of the valves 60, 61 via lines 67 and 68 respectively.

Platen

Figure 4:
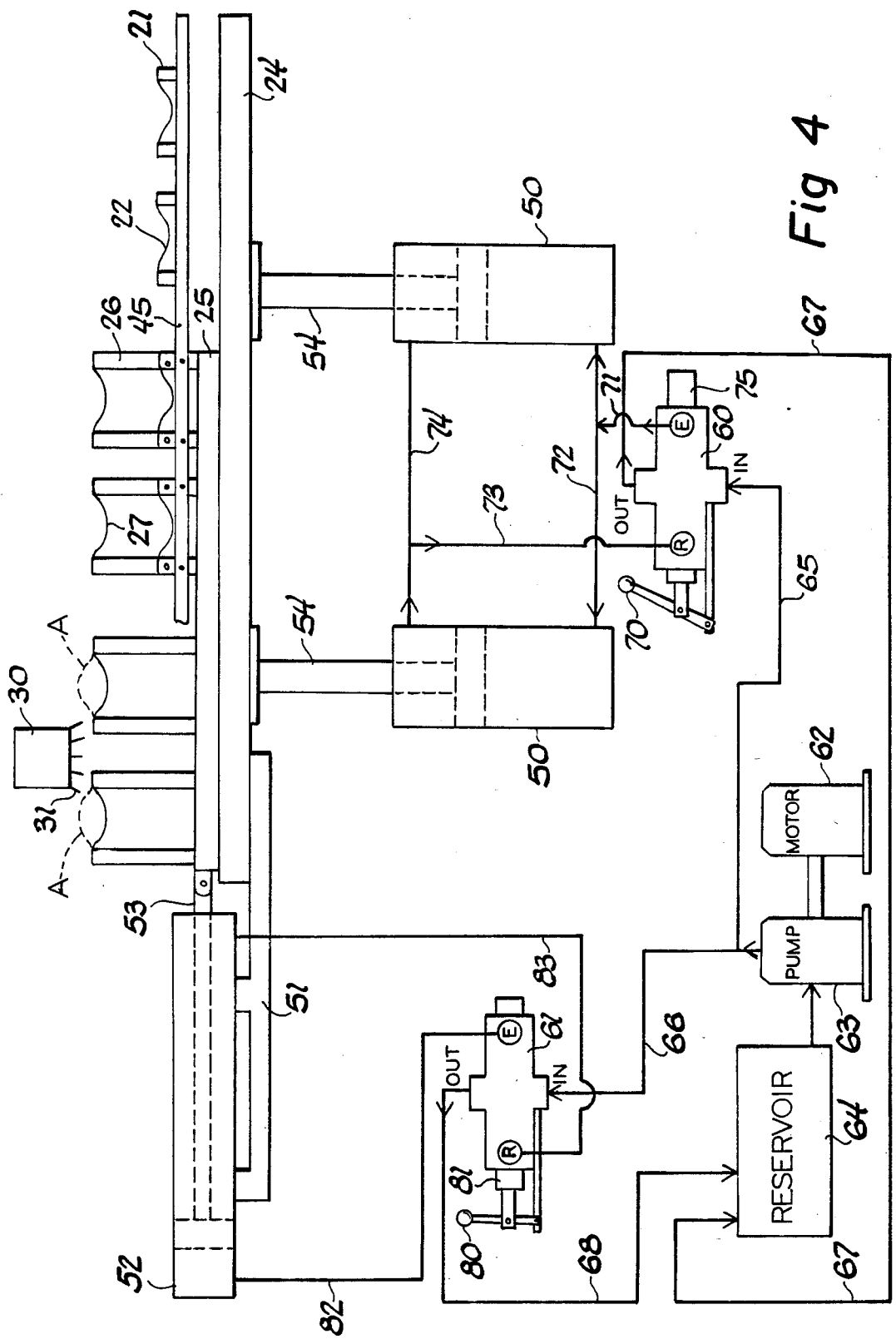
FIGS. 4 through 11 are the same in structure as FIG. 3, but show the various motions and positions of the platen and shuttle to move the workpieces along the line.

To raise the platen 24 and shuttle 25 from the position of FIG. 3 to FIG. 4, the operator moves the handle 70 toward the valve 60 and oil flows via a channel in the valve spool 75 to the cylinders 50 from the "IN" port to elevate port "E" and via lines 71 and 72 and the piston rods 54 move up raising the platen 24 and shuttle 25 and workpieces A—A to the position of FIG. 4.

In the raising of the piston rods 54, the out-flowing oil in lines 73 and 74 enters the "R" port and is channeled by the valve spool 75 to the "OUT" port and line 67 to the reservoir 64.

Figure 5:
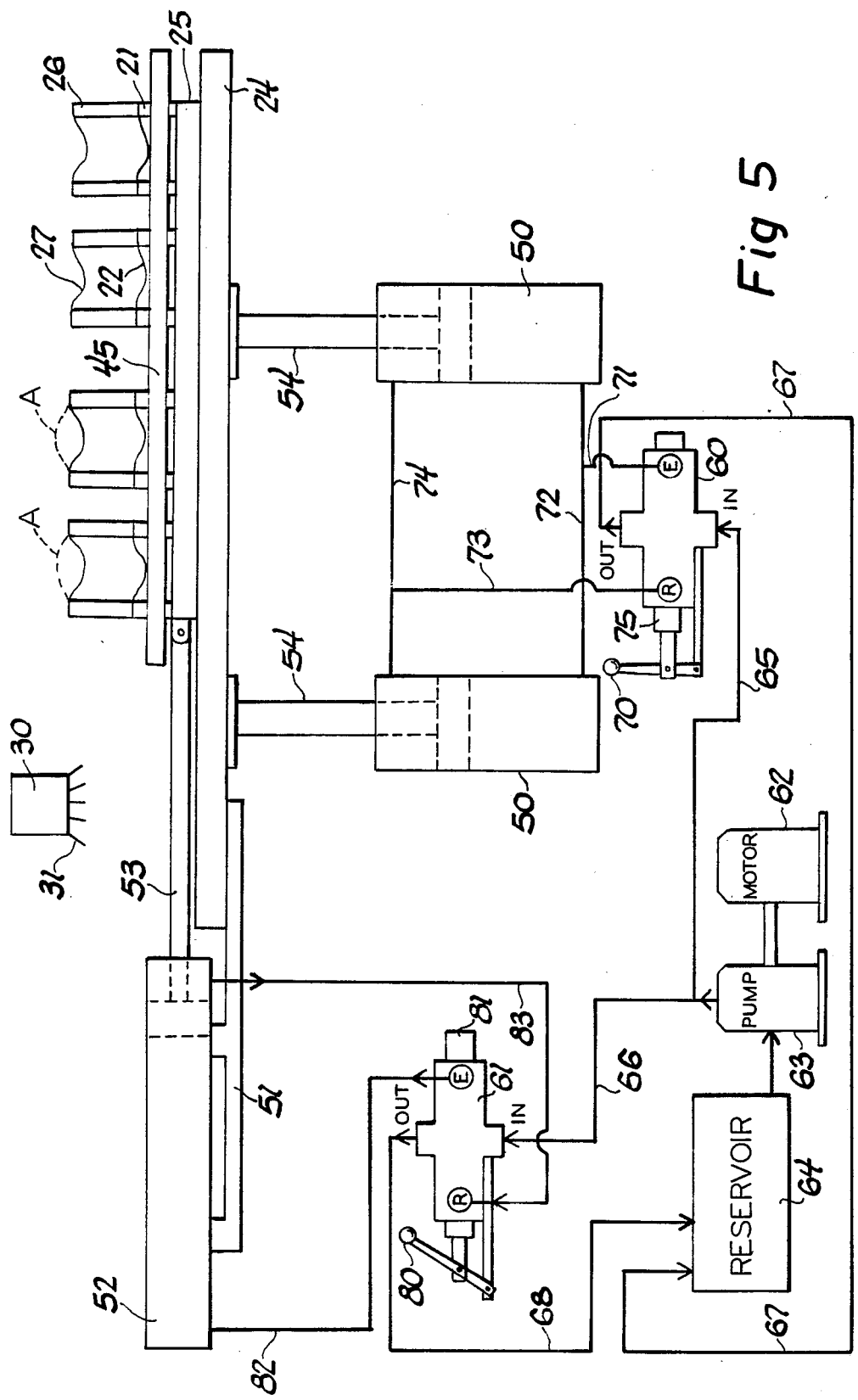
Figure 6:
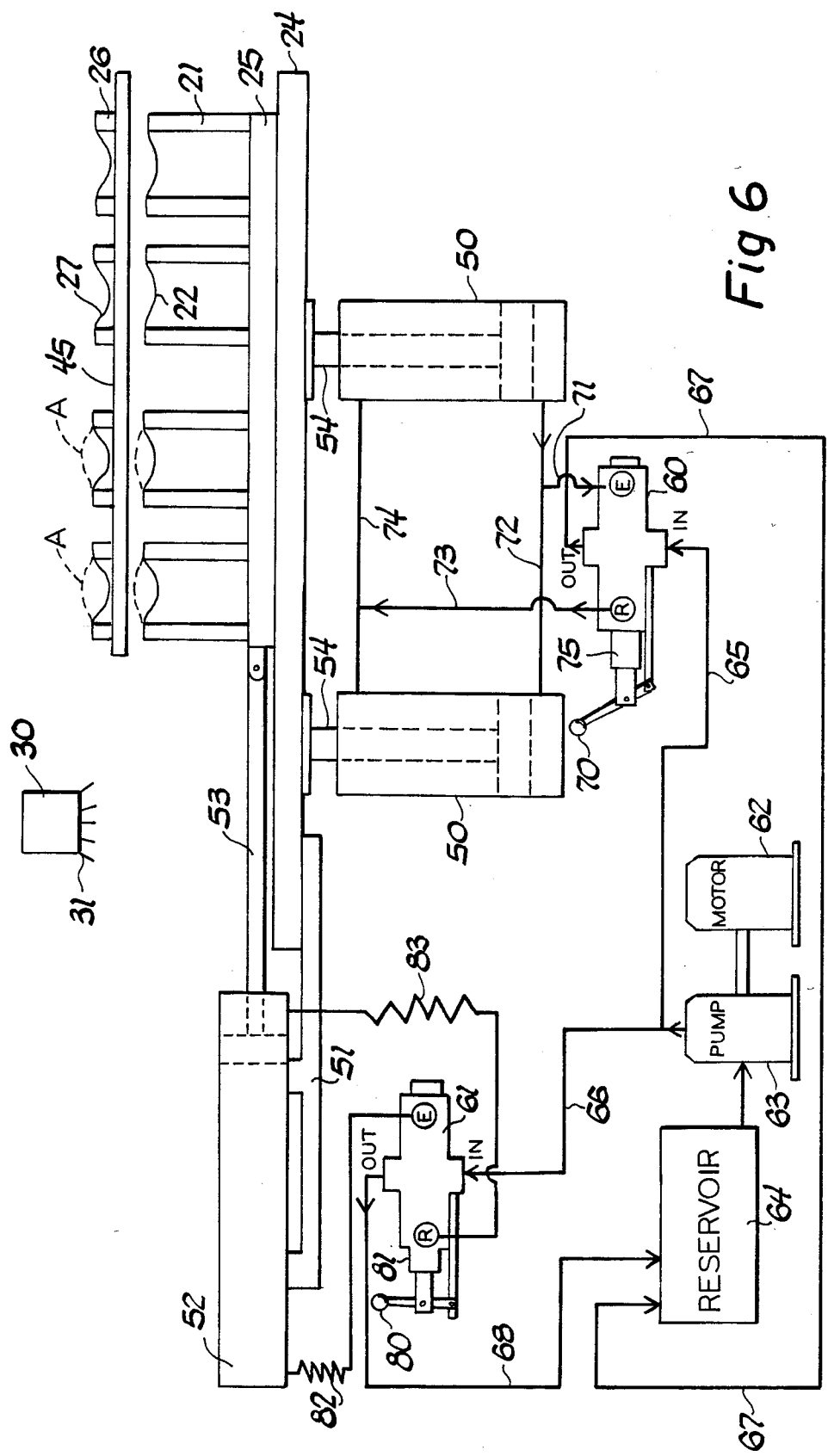

To lower the platen 24 and shuttle 25 from the raised position of FIG. 5 to the lowered position of FIG. 6, the operator moves the handle 70 away from the valve 60 and oil flows via a channel in the valve spool 75 to the cylinders 50 from the "IN" port to return port "R" and via lines 73, 74 and the piston rods 54 move down to the position of FIG. 6.

In lowering the piston rods 54, the out-flowing oil in lines 71, 72 enters the "E" port and is channeled by the valve spool 75 to the "OUT" port and line 67 to the reservoir 64.

Shuttle

To move the shuttle 25 out on the platen 24 from the position of FIG. 4 to the position of FIG. 5, the operator moves the handle 80 toward the valve 61 and oil flows via a channel in the valve spool 81 from the "IN" port to the "E" port and line 82 to the cylinder 52 and the piston rod 57 extends the shuttle 25 to the position of FIG. 5.

In moving the shuttle 25 out, the out-flowing oil in line 83 enters the "R" port and is channeled by the valve spool 81 to the "OUT" port and line 68 to the reservoir 64.

Figure 7:
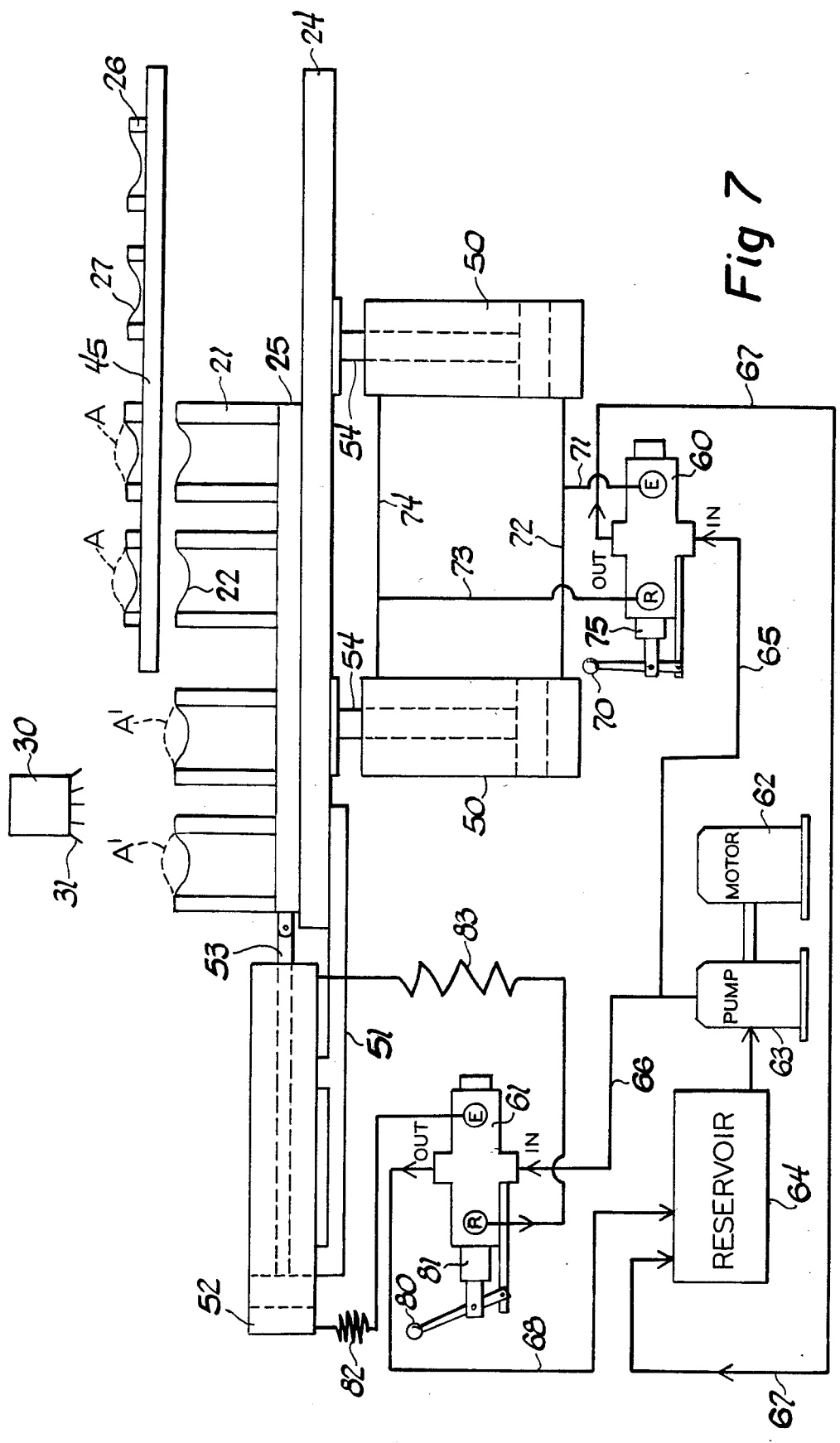

To return the shuttle 25 on the platen 24 from the position of FIG. 6 to the position of FIG. 7, the operator moves the handle 80 away from the valve 61 and oil flows via a channel in the valve spool 81 from the "IN" port to the "R" port and line 83 returning the shuttle to the position of FIG. 7.

In returning the shuttle 25, the outflowing oil in line 82 enters the "E" port and is channeled by the valve spool 81 to the "OUT" port and line 68 to the reservoir 64.

It is to be understood that the operation of the valve 60 to raise and lower the platen 24 and the operation of valve 61 to extend and return the shuttle 25 are applicable to all FIGS., 3 to 11.

WORKPIECE HANDLING

At the start of workpiece transferring, FIG. 3, the operator-workman places the workpieces A—A in the shuttle slings 27 at loading station I and pushes the handle 70 toward the valve 60 and the platen 24 rises to the position of FIG. 4. The operator then pushes the handle 80 toward the valve 61 and the shuttle 25 moves to the position of FIG. 5 in work stations II and III. The operator then pulls the handle 70 outward of the valve 60 and the platen 24 descends leaving workpieces A—A on the frame stirrups 22 of work station II, FIG. 6. The operator then pulls the handle 80 outward of the valve 61 and the shuttle 25 is retracted to the position of FIG. 7 where the workpieces A'—A' are loaded on the shuttle slings 27 at loading station I.

Figure 8:
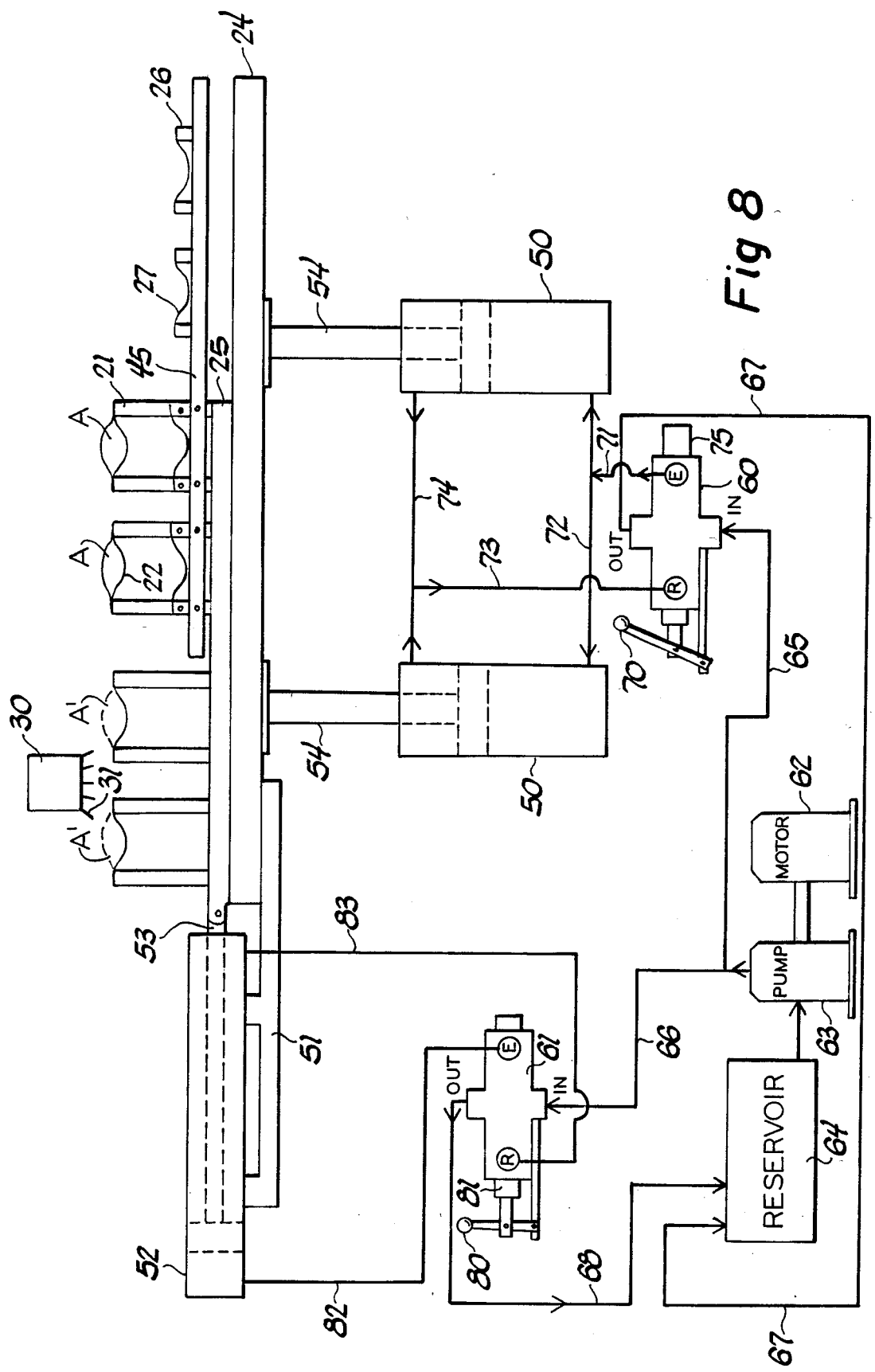
Figure 9:
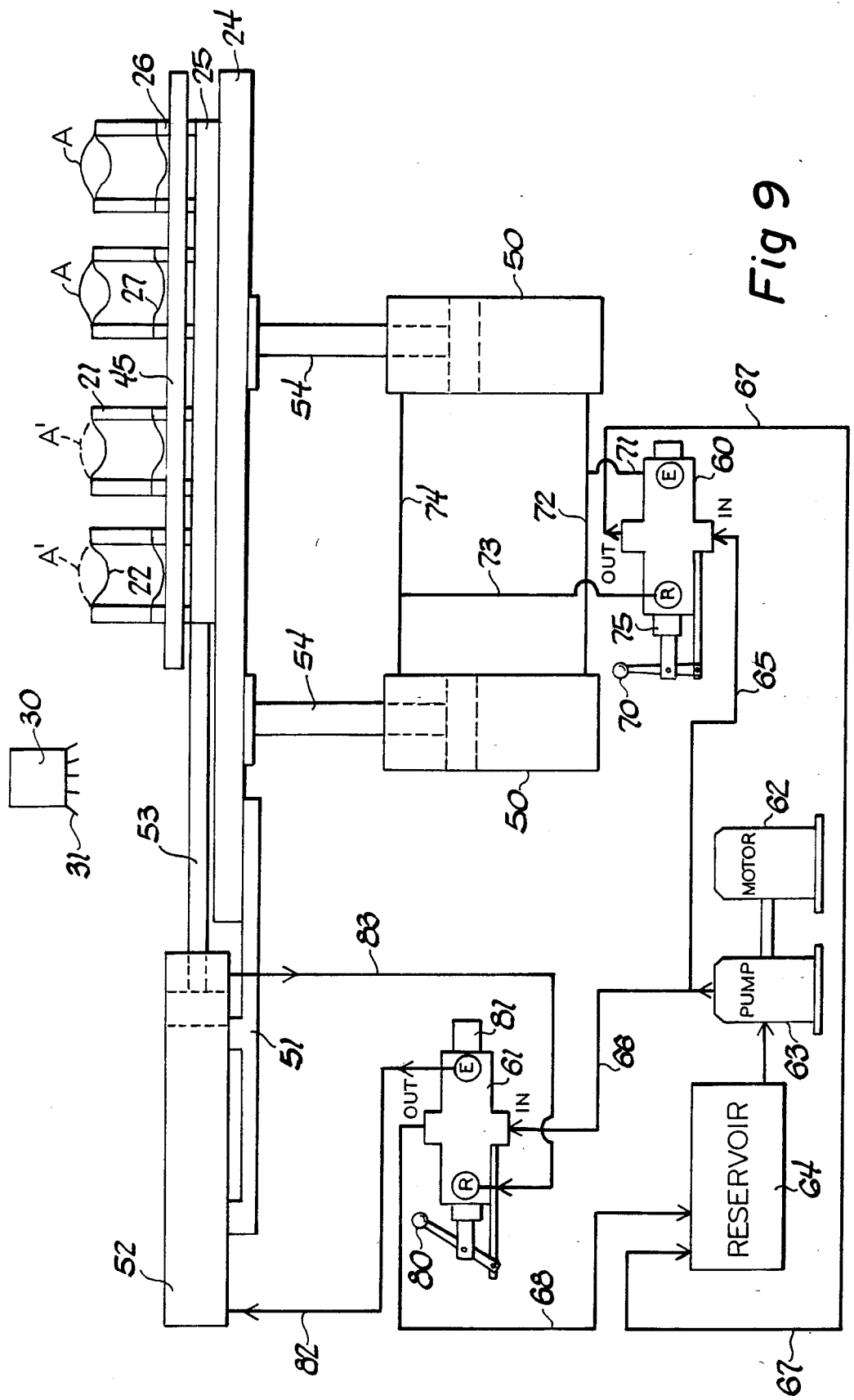
Figure 10:
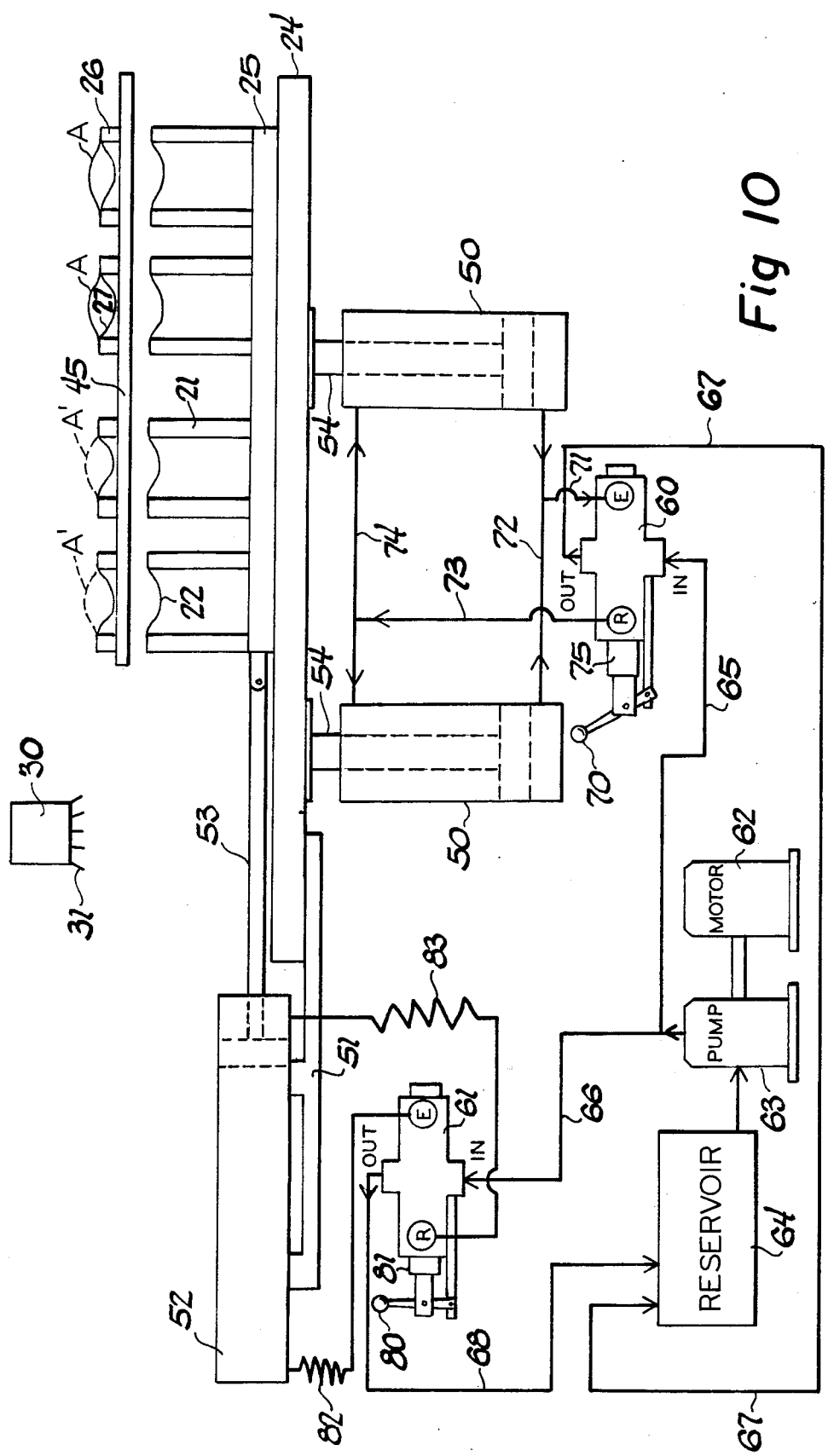
Figure 11:
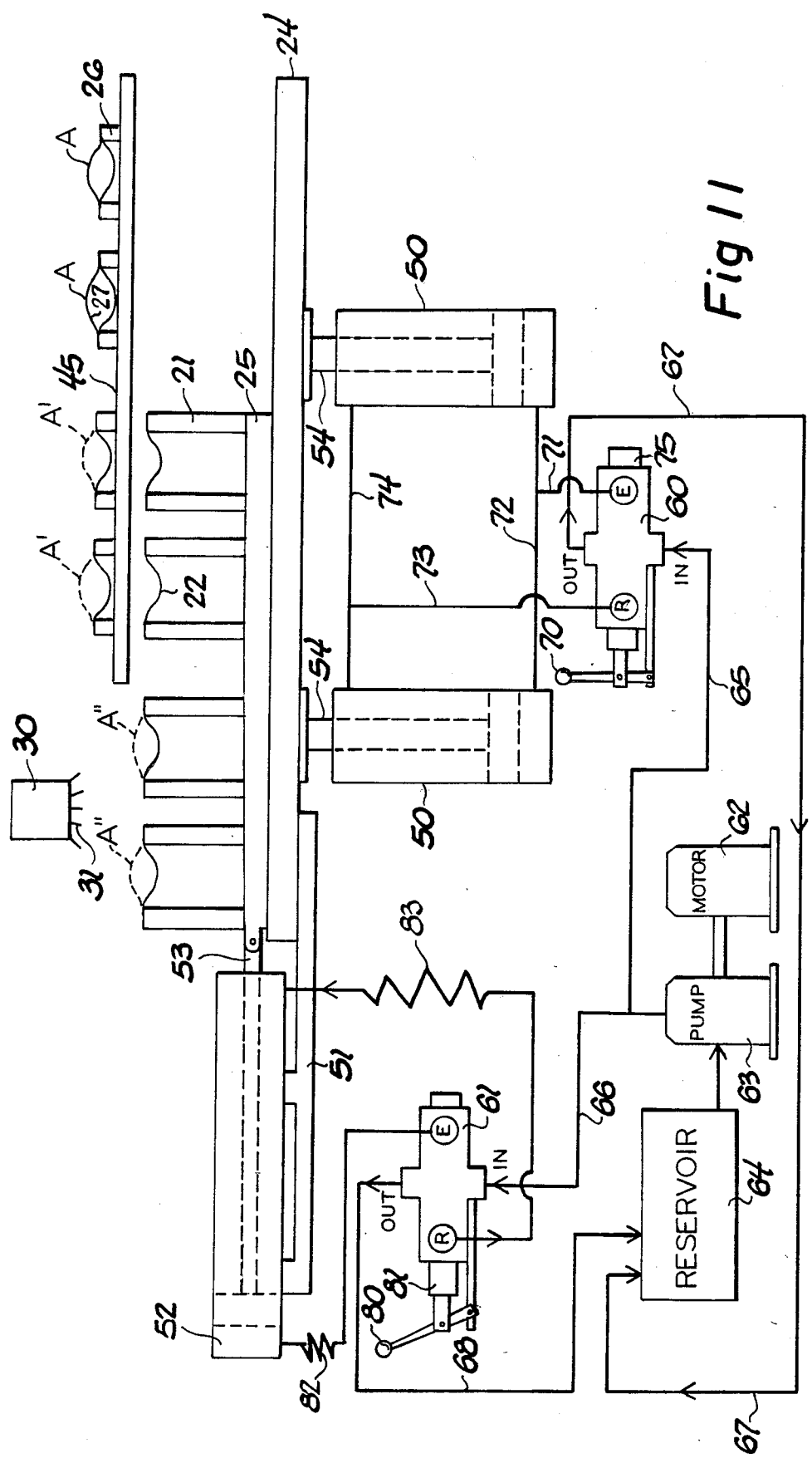

The operator then pushes the handle 70 toward the valve 60 and the platen 24 is raised lifting the workpieces A'—A' to the position of FIG. 8 which lifts the workpieces A—A from the frame stirrups 22 in station II. The operator then pushes the handle 80 toward the valve 61 and the shuttle 25 is moved to the position of FIG. 9. The operator then pushes handle 70 toward the valve 60 and the platen 24 descends leaving the workpieces A—A on the frame stirrups 22 of station III and the workpieces A'—A' on the frame stirrups 22 of station II, FIG. 10. The operator then pulls the handle 80 outwardly of the valve 61 and the shuttle 25 moves to the retracted position as seen in FIG. 7. The operator then loads workpieces A"—A" in the shuttle slings 27 at loading station I with the workpieces A—A removed from the frame stirrups 22 in station III, FIG. 11.

The operator then pushes the handle 70 toward the valve 60 and the platen 24 is raised to the position of FIG. 8 lifting the workpieces A'—A' from the frame stirrups 22 in loading station I similar to FIG. 8 except that the workpieces in loading station I are A"—A" and the workpieces in station II are A'—A'. The operator then pushes the handle 80 toward the valve 61 and the shuttle 25 is moved to the position of FIG. 9. The operator then pushes handle 70 toward the valve 60 and the platen 24 descends leaving the workpieces A"—A" in work station II on the frame stirrups 22 and workpieces A'—A' in work station III on the frame stirrups 22 similar to that seen in FIG. 9. The operator then loads now workpieces in the shuttle slings 27 at station I and the workpieces A'—A' are removed from the frame stirrups 22 in work station III similar to that seen in FIG. 11.

The loading is repetitive with the operator adding new workpieces at loading station I; raising the platen 24; extending the shuttle 25; and reloading new workpieces in loading station I until the desired number of workpieces are processed.

HOG CARCASS PROCESSING

Figure 12:
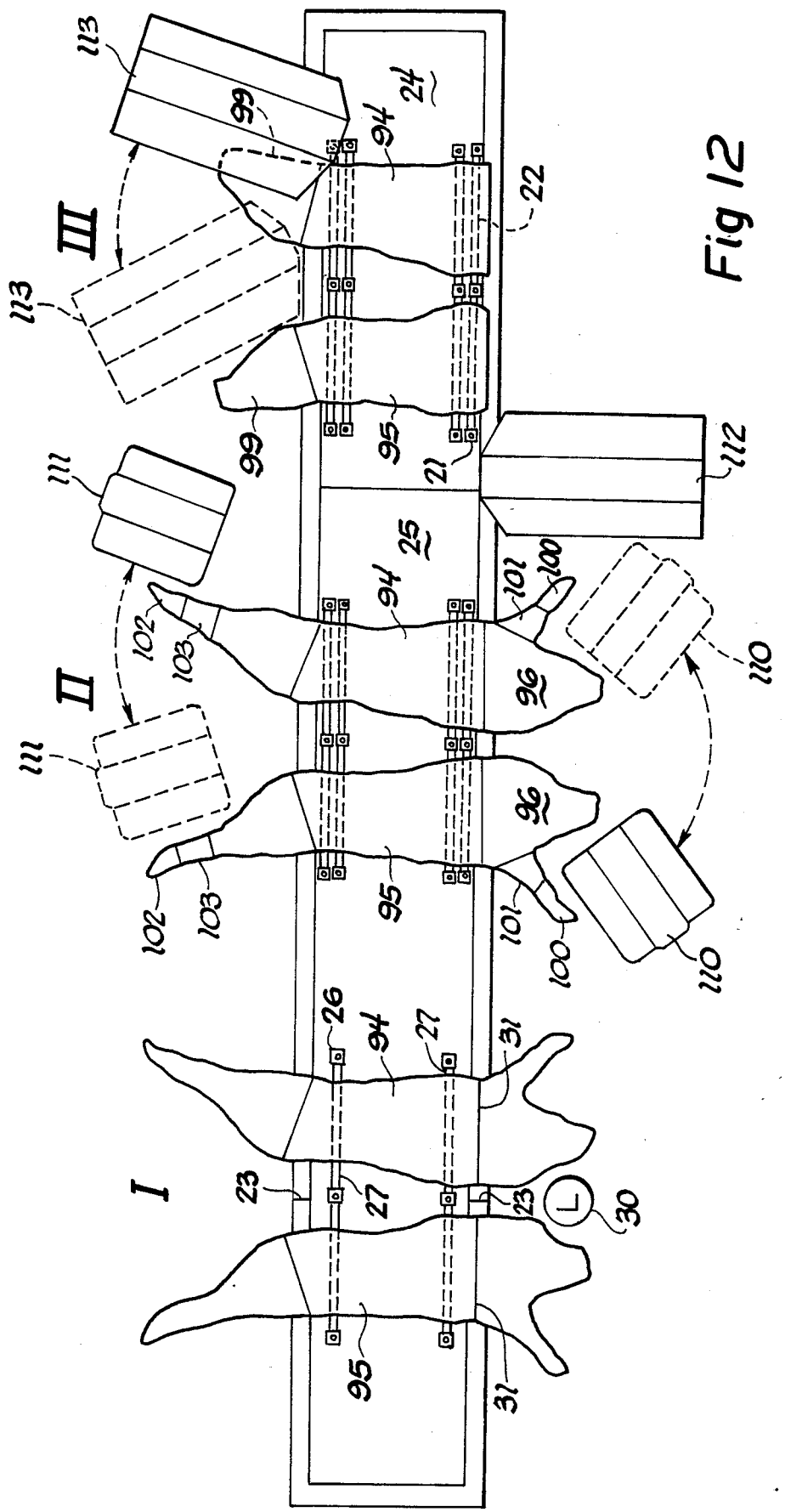
FIG. 12 is a top diagrammatic view showing the shuttle in the raised and retracted position carrying reloaded workpieces on the shuttle slings in station I, workpieces in station II on the shuttle slings and workpieces on the frame stirrups at station III just prior to being ejected to clear station III, so that the shuttle can repeat motions advancing workpieces.

Referring now to FIG. 12, split hog carcasses 94 and 95 are shown in station I lying on the shuttle slings 27 with the line of light 31 projected on the space between the second and third ribs of the carcasses 94, 95. The shuttle 25 as shown in FIG. 12 is retracted and raised as seen in FIG. 8 with partially processed carcasses 94, 95 at stations II and III.

At this point in processing the hams 99 are cut off and the remaining loin-belly portion is removed from station III leaving station III empty. The carcasses 94, 95 in station II lie on the shuttle slings 27. Prior to this point the rear feet 102 and hocks 103 and the front feet 100 and picnics 101 have been cut off in station II. The shuttle 25 is then advanced over stations II and III and lowered which deposits the carcasses from station II in station III and the carcasses from station I in station II. When the carcasses of station II move to station II the shoulder 96 is cut off. Then station I is reloaded and the cycle is repeated as hereinbefore depicted in FIGS. 3 to 11.

Tools 110, 111, 112 and 113 are power driven bone and meat saws or circular knives which are counterbalanced on swing cables allowing the workman to position the saw or knife quickly and easily at the porper point and angle to make the desired cut as indicated by the dotted line alternate positions of the tools.

While the disclosed and described method and apparatus, singly and in combination, illustrate the invention, it will be understood that other embodiments may lie within the scope of the appended claims which define the protection of the invention.

I claim:

1. Apparatus for moving objects sequentially and successively between stations of a production line comprising, a frame, at least one loading station and at least first and second work stations at said frame, a vertically movable platen within said frame below said stations, a longitudinally movable shuttle on said platen, at least one loading station and one transfer station on said shuttle corresponding with said frame stations;

vertical power means for raising and lowering said platen with said shuttle thereon relative to said frame, shift power means for moving said shuttle on said platen to locate said shuttle stations between a home position at said frame loading station and said first work station of said frame and a shunt position at said first and second work stations of said frame;

relatively low object positioning means on said frame at said first and second work stations, relatively high object holding means at said loading and transfer stations on said shuttle corresponding to said positioning means on said frame enabling said shuttle holding means to deposit objects on when lowered and to lift objects off said frame positioning means when said shuttle is raised;

said positioning means on said frame and said holding means on said shuttle being out of registration to avoid interference during relative longitudinal movement;

said shuttle having a home position with its said stations lying at said frame loading station and said first work station and a shunt position with said shuttle stations lying at said frame first and second work stations;

raising said shuttle via said platen and power means at its home position elevating objects on said shuttle loading station with said shuttle transfer station lifting any objects off said frame holding means at said frame first work station above said frame holding means to avoid interference between said holding means and said positioning means, outward shunt movement by said shift power means of said shuttle in its elevated position moves objects on said shuttle holding means over said frame positioning means at said frame first and second work stations;

lowering of said shuttle in its shunt position drops said shuttle and holding means below said frame positioning means depositing the objects off said shuttle holding means at said shuttle loading station on to said frame positioning means at said frame first work station and depositing objects from said first work station carried on said shuttle transfer station onto said frame second work station with said shuttle and holding means dropping below interference with said frame positioning means and any objects thereon, and reverse movement of said shuttle in its lowered shunt position by said shift power means retracts said shuttle to its home position for reloading and recycling.

2. In an apparatus as set forth in claim 1, tools at said frame work stations for performing work on the objects on said frame positioning means.

3. In an apparatus as set forth in claim 1, said frame having additional work stations and object positioning means downstream from said second work station on said frame; and additional transfer stations and holding means on said shuttle for servicing said additional work stations and positioning means on said frame.

4. In an apparatus as set forth in claim 3, tools at said additional work stations for performing work on the objects on said frame positioning means.

* * * * *